(12) United States Patent  
Hlinka

(10) Patent No.: US 8,167,525 B2  
(45) Date of Patent: May 1, 2012

(54) METHOD AND APPARATUS FOR UNLOADING MATERIAL FROM A CONTAINER

(75) Inventor: James J. Hlinka, Winfield, IL (US)

(73) Assignee: CST Industries, Inc., Kansas City, KS (US)

( * ) Notice: Subject to any disclaimer, the term of this patent is extended or adjusted under 35 U.S.C. 154(b) by 1044 days.

(21) Appl. No.: 11/814,812

(22) PCT Filed: Jan. 27, 2006

(86) PCT No.: PCT/US2006/003135  
§ 371 (c)(1),  
(2), (4) Date: Apr. 22, 2008

(87) PCT Pub. No.: WO2006/081523  
PCT Pub. Date: Aug. 3, 2006

(65) Prior Publication Data  
US 2008/0304945 A1 Dec. 11, 2008

Related U.S. Application Data

(60) Provisional application No. 60/648,373, filed on Jan. 28, 2005.

(51) Int. Cl.  
*B65G 65/00* (2006.01)

(52) U.S. Cl. .................................. 414/305; 414/808

(58) Field of Classification Search .............. 414/295, 414/296, 301, 307, 310, 315, 808  
See application file for complete search history.

(56) References Cited

U.S. PATENT DOCUMENTS

| | | | | | |
|---|---|---|---|---|---|
| 3,298,543 | A | * | 1/1967 | Laidig | 414/307 |
| 3,438,517 | A | * | 4/1969 | Steffen | 414/295 |
| 3,539,058 | A | * | 11/1970 | Ferris | 414/307 |
| 3,851,774 | A | * | 12/1974 | Laidig et al. | 414/307 |
| 4,426,187 | A | * | 1/1984 | Olson | 414/310 |
| 4,529,347 | A | | 7/1985 | Fontaine et al. | |
| 4,583,903 | A | * | 4/1986 | Hutchison | 414/311 |
| 4,671,727 | A | * | 6/1987 | Hlinka et al. | 414/306 |
| 5,004,400 | A | * | 4/1991 | Handke | 414/808 |
| 2005/0254922 | A1 | * | 11/2005 | Berreau et al. | 414/310 |

OTHER PUBLICATIONS

Aliance 98 (Web Archive), Jan. 20, 2004; http://web.archive.org/web/20040120003751/www.harvestore.com/59/Allian98.html.*  
Alliance Unloader (Web Archive), Dec. 2, 2003; http://web.archive.org/web/20031202203508/www.harvestore.com/26/Alliance.html.*

(Continued)

*Primary Examiner* — Joshua Rudawitz  
(74) *Attorney, Agent, or Firm* — Michael Best & Friedrich LLP

(57) ABSTRACT

An unloader for unloading material from a container. In some embodiments, the unloader can include an unloader arm movable within the container, a first chain coupled to the unloader arm and movable to unload material from the container, and a second chain coupled to the unloader arm and positioned to engage material within the container upon movement of the unloader arm. The unloader can have a sensor adapted to transmit signals indicative of a force applied to the unloader arm, the first chain, and/or the second chain. A controller can receive the signal from the sensor, and can alter an operation of the unloader arm, the first chain, and/or the second chain based upon the signal received from the sensor.

21 Claims, 10 Drawing Sheets

OTHER PUBLICATIONS

Alliance Unloader Product Sheet PDF; Copyright date 2001, Archived on Jan. 27, 2004; http://web.archive.org/web/20040127104650/http://www.slurrystore.com/Literat/PDFS/ALLIABRO.PDF.*

Engineered Storage Products Company, "Alliance Unloader Operation and Maintenance Manual," dated Jul. 1, 2004 (75 pages).

Engineered Storage Products Company, "Alliance Automatic Controller Project," dated Feb. 2, 2004 (34 pages).

Engineered Storage Products Company, "Alliance Automatic Controller Project," dated Apr. 1, 2004 (13 pages).

Engineered Storage Products Company, "Controllers Illustrated Parts List," dated Sep. 1, 2004 (55 pages).

Engineered Storage Products Company, "Alliance Chain-Type Unloader Illustrated Parts List," dated Sep. 1, 2004 (77 pages).

Engineered Storage Products Company, "Alliance Unloader Automatic Controller Configuration Guide," dated Jun. 1, 2004 (7 pages).

Engineered Storage Products Company, "Alliance Automatic Controller," dated Apr. 1, 2004 (11 pages).

Engineered Storage Products Company, "Alliance Unloader, A history of innovation and on-going improvements," dated Jan. 1, 1999 (2 pages).

A. O. Smith Harvestor Products, Inc., "Atlas Unloader, New 1998 Model Year Features," dated Jan. 1, 1997 (2 pages).

Engineered Storage Products Company, "Alliance Unloader, New 1998 Features Introduced Webpage," dated Jan. 20, 2005 (4 pages).

Engineered Storage Products Company, "Alliance Unloader, New 1998 Model Year Features." dated Jan. 1, 1998 (2 pages).

Engineered Storage Products Company, "Alliance Unloader, Our Most Powerful Forage Unloader," dated Jan. 1, 2001 (4 pages).

Engineered Storage Products Company, "The Harvestore Feed Storage Structure," dated Jan. 1, 2001 (8 pages).

Canadian Intellectual Property Office Action in application No. 2,596,088 dated Jul. 20, 2009 (2 pages).

* cited by examiner

METHOD AND APPARATUS FOR UNLOADING MATERIAL FROM A CONTAINER

CROSS REFERENCE TO RELATED APPLICATIONS

Priority is hereby claimed to U.S. Provisional Application No. 60/648,373, filed on Jan. 28, 2005, the entire contents of which are incorporated herein by reference.

BACKGROUND

Embodiments of the present invention relate to material unloaders typically used to remove material from containers. By way of example, some embodiments of the present invention relate to removal of material from grain elevators and/or to operation of such material unloaders.

Grain, other relatively free-flowing materials, and many other less free-flowing materials are frequently stored in silos or other storage structures (hereinafter referred to only as "silos", regardless of shape or size) adapted for or otherwise capable of being unloaded from a bottom area via an unloader. A number of different bottom unloaders exist, many of which include a sweep auger that rotates within the silo. This rotating action helps to loosen the material within the silo, to move the material, and to ready the material for removal from the silo. In some cases, the stored material is delivered by the sweep auger to a central area of the silo where it falls into a silo outlet or into a trough leading to a silo outlet.

Many conventional unloader systems are limited in their ability to adapt to different material moving and removal conditions. For example, a conventional unloader may be well suited for moving and removing certain materials (e.g., material type, length, and density) under certain conditions (e.g., moisture content), while being poorly suited for moving and removing other materials in other conditions. This inconsistency can require increased operator attention in operating such an unloader, and can make the unloader more difficult to operate and to operate efficiently. Also, many types of materials stored in silos can become compacted and can therefore be relatively difficult to unload (e.g., ground ear corn, grain, meat meal, starch, hay, and the like). A buildup of compacted material makes moving and removing the material difficult, and requires a mechanism to help in these processes.

SUMMARY

Some embodiments of the present invention provide an unloader for unloading material from a container, wherein the unloader comprises an unloader arm movable within the container; a first chain coupled to the unloader arm and movable to unload material from the container; a second chain coupled to the unloader arm and positioned to engage material within the container upon movement of the unloader arm; a sensor configured to transmit a signal indicative of force applied to at least one of the unloader arm, the first chain, and the second chain; and a controller in communication with the sensor to receive the signal from the sensor and to alter an operation of at least one of the unloader arm, the first chain, and the second chain, the alteration based at least partially on the signal received from the sensor.

In some embodiments, a method of controlling a rate of material removal from a container is provide, and comprises inputting a desired unloading characteristic into a controller of an unloader, wherein the unloader includes an unloader arm; starting the unloader; moving a chain coupled to the unloader arm; pivoting the unloader arm in an interior space of the container; engaging material in the interior space of the container with the unloader arm; detecting a threshold force upon at least one of the chain and the unloader arm; and altering motion of the unloader arm in response to the recognition of the unloader arm loading characteristic.

Some embodiments of the present invention provide an unloader for unloading material from a container, wherein the unloader comprises an unloader arm movable within a container to engage and move material from the container; a motor coupled to the unloader arm and operable to advance the cutter arm in material within the container, a sensor configured to transmit a first signal indicative of a loading characteristic of the cutter arm; and a controller in communication with the sensor, the controller responsive to the first signal from the sensor by stopping advancement of the cutter arm within the container.

In some embodiments of the present invention, a method of controlling a rate of material removal from a container is provided, and comprises inputting at least one of a material characteristic and a container characteristic into a controller of an unloader, wherein the unloader includes an unloader arm positioned to remove material from the container; determining a threshold value based at least partially on at least one of the material characteristic and the container characteristic, wherein the threshold value corresponds to an amount of force transmitted to at least one of the unloader arm and a chain coupled to the unloader arm; starting the unloader; moving the chain coupled to the unloader arm; pivoting the unloader arm in an interior space of the container; engaging material in the interior space of the container with the unloader arm; detecting a threshold force upon at least one of the chain and the unloader arm; and comparing the threshold force to the threshold value; and altering motion of the unloader arm in response to comparing the threshold force to the threshold value.

Further aspects of the present invention, together with the organization and operation thereof, will become apparent from the following detailed description of the invention when taken in conjunction with the accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
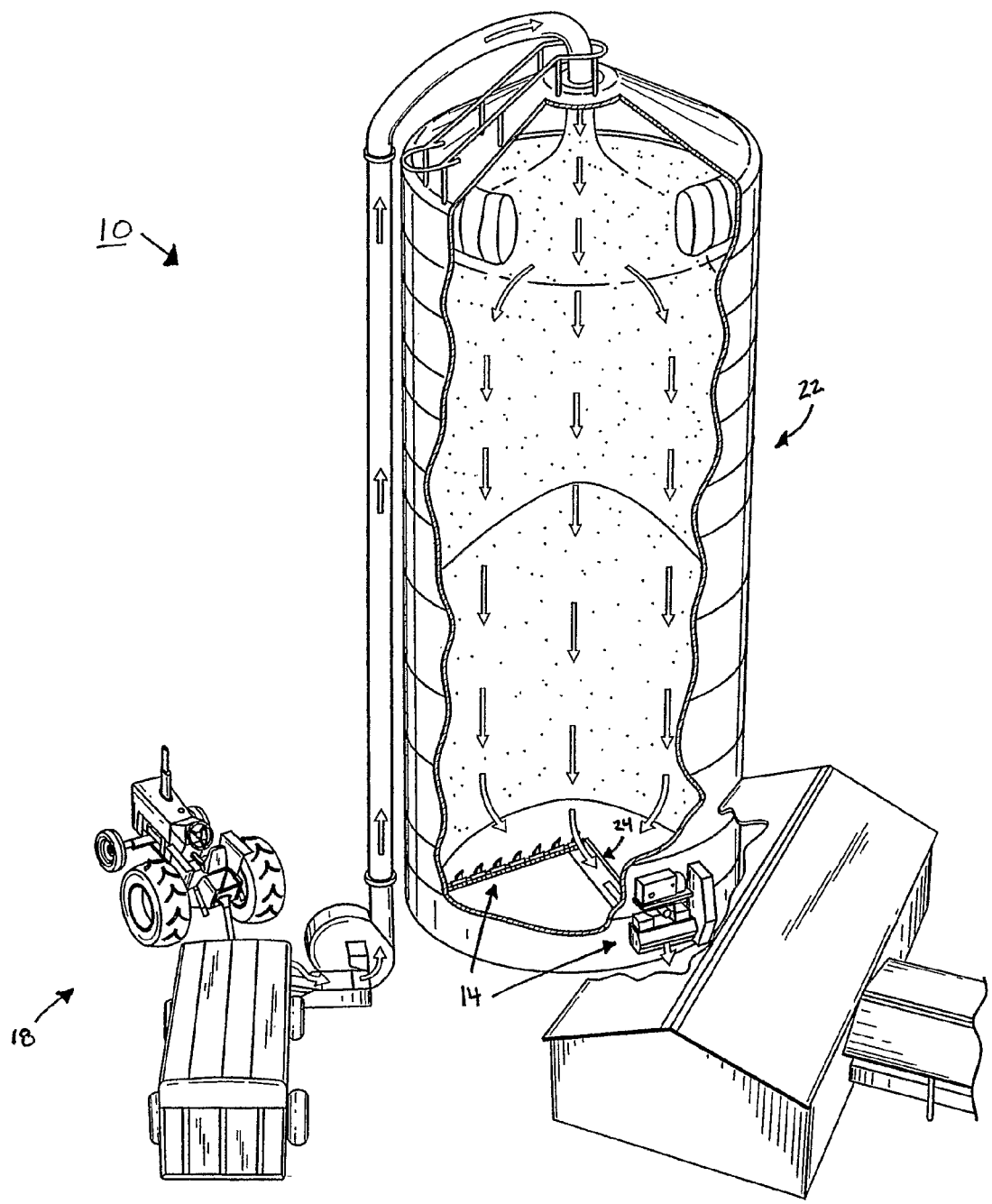
FIG. 1 illustrates a farm silo having an unloader according to an embodiment of the present invention.

FIG. 1 illustrates a farm system 10 that is equipped with a material unloader (hereinafter referred to only as "unloader") 14. In some embodiments, a material (e.g., hay, grain, alfalfa, corn, and the like) is unloaded from a farm implement 18 (shown generally as a tractor and trailer in FIG. 1) and transferred into a silo 22 where it is stored until the material is ready to be transported elsewhere. The material can then be unloaded from the silo 22 by the unloader 14 through a trough 24 in the base or bottom of the silo 22, as described in greater detail below.

Although the application of the unloader 14 is in a farm silo for moving farm product in the illustrated embodiment of FIG. 1, it should be noted that this application is presented by way of example only. The unloader 14 of the present invention can be used to unload any type of material from any storage container having any shape and size (referred to herein only as "silo" as mentioned above), and can have any size adapted for this purpose.

Figure 2:
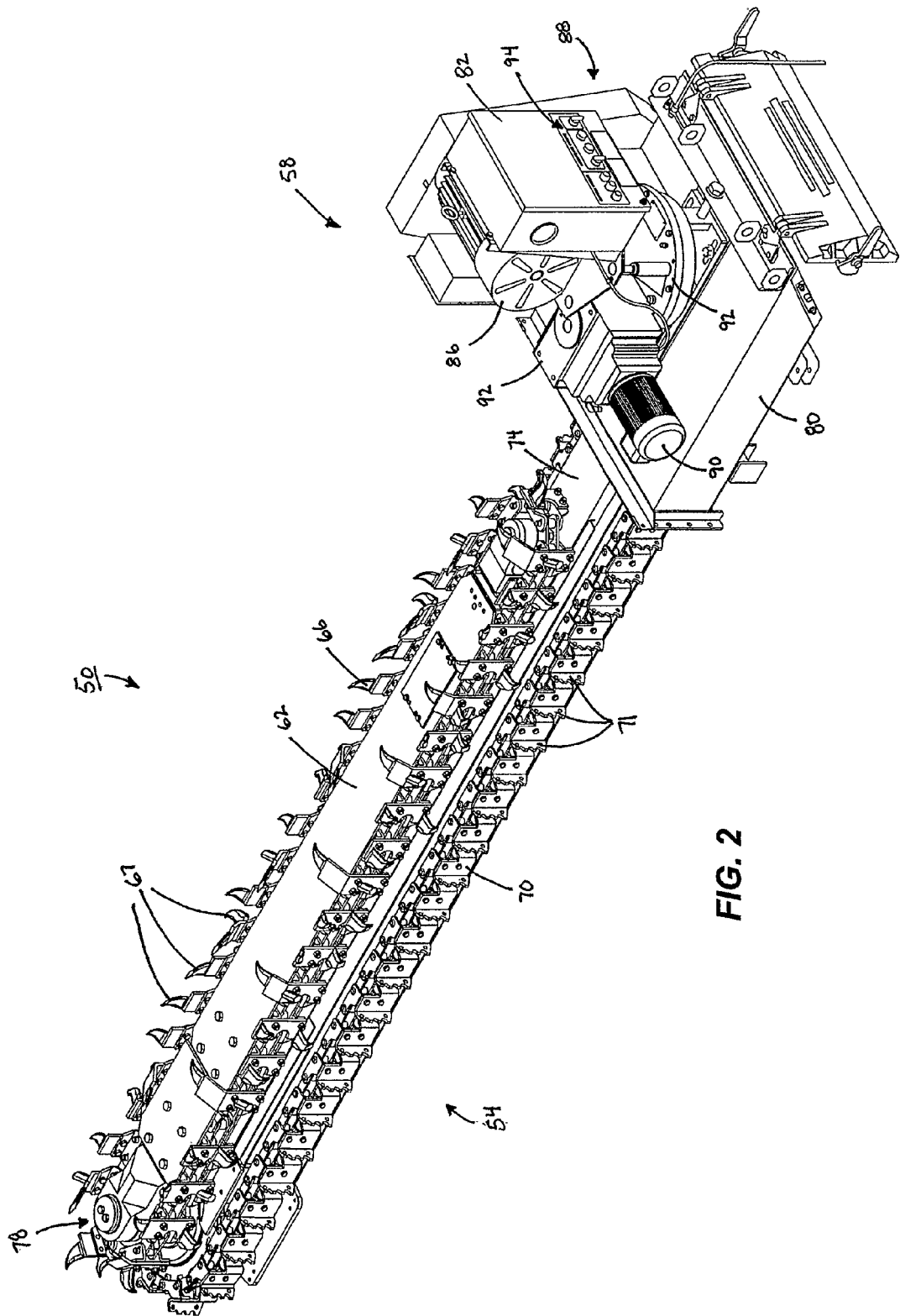
FIG. 2 is a perspective view of an unloader according to an embodiment of the present invention.

FIG. 2 illustrates an unloader 50 according to an embodiment of the present invention. The unloader 50 includes an arm assembly 54 and an unloader drive section 58. It should be noted that other embodiments of the present invention can have different combinations of the elements (described below) of the arm assembly 54 and the unloader drive section 58, and can utilize such elements in different configurations.

The arm assembly 54 can include a cutter arm 62 having a chain with hooks 66 (referred to hereinafter collectively as a "cutter chain"), a chain with conveyor paddles 70 (referred to hereinafter collectively as a "conveyor chain"), a frame 74, and a pivot assembly 78. Both chains 66, 70 can have a number of different types of implements (67, 71, respectively) for cutting and/or moving product. Examples of such implements are hooks, blades, barbs, paddles, claws, rods, and the like. As used herein and in the appended claims, the term "blade" refers to any such product cutting and/or moving implement. The blades of the cutter and conveyor chains 66, 70 can be attached to and driven by a number of different types of elements, including without limitation chains, belts, cables, and the like. As used herein and in the appended claims, the term "chain" refers to any such element.

In some embodiments, the cutter arm 62 and the cutter chain 66 are configured to move independently with respect to the conveyor chain 70, using a process that will be described in greater detail below. In other embodiments, the cutter arm 62 and cutter chain 66 are not adapted to move independently with respect to the conveyor chain 70. Also, the cutter chain 66 and the conveyor chain 70 in the illustrated embodiment of FIG. 2 are capable of movement independent of the cutter arm 62, although such independent movement is not required in other embodiments. Furthermore, although the cutter chain 66 and conveyor chain 70 illustrated in FIG. 2 are driven together, the cutter chain 66 and conveyor chain 70 are movable independently with respect to one another in other embodiments.

The cutter arm 62 illustrated in FIG. 2 is configured to pivot around the pivot assembly 78 and to rotate the cutter chain 66 to drive the blades 67 thereon. The function of the cutter chain 66 is to break up material within the silo 22 so that it can be removed by the conveyor chain 70 through a discharge chute 80. As the cutter arm 62 pivots about the pivot assembly 78, the cutter arm 62 comes into contact with material in the silo 22. The speed with which the cutter arm 62 pivots can be regulated so that the cutter arm 62 moves through the material without causing damaging stress on motor and power transmission components of the unloader 50 driving the cutter arm 62, using a process described in greater detail below.

Referring still to FIG. 2, the drive section 58 of the illustrated unloader 50 includes a control box 82, a main motor 86, and a cutter arm motor 90. In alternative embodiments, the control box 82, main motor 86, and/or cutter arm motor 90 can be arranged differently. Additionally or alternatively, multiple components of the drive section 58 can be removed or replaced, as described in greater detail below and with respect to FIG. 3.

The outer surface of the control box 82 generally includes a plurality of user input devices 94. The user input devices 94 shown in FIG. 2 include a plurality of pushbuttons and selector switches. However, any other user input device or combination of user input devices can also be employed (e.g., one or more dials, knobs, slides, key pads, touch screens, LCD screens, and the like). The control box 82 houses control hardware that can be used to initialize various functions of the unloader 50. For example, in some embodiments, the control box 82 houses one or more motor drives, programmable logic controllers ("PLCs"), sensors, relays, and/or safety switches that can be used to control the functions of the unloader 50, as described in greater detail below.

The main motor 86 in the illustrated embodiment of FIG. 2 provides the force or torque needed to drive and rotate the cutter chain 66 and the conveyor chain 70 (described below). In some embodiments, the main motor 86 is a 30 horsepower ("hp") class "B" electric motor, although other motors can be used (e.g., motors larger or smaller than 30 hp, industrial class motors, hydraulic motors, magneto-drive motors, internal combustion engines, and the like). Unless otherwise specified, the term "motor" as used herein and in the appended claims refers to any such prime mover. The main motor 86 is coupled to one or more gears, pulleys, sprockets, drums, belts, chains, cables, drive shafts, and/or other power transmission components (covered by a shroud 88 in FIG. 2), which ultimately rotate the cutter chain 66 and the conveyor chain 70. In some embodiments, the main motor 86 is configured to operate at only one speed. As a result, the speed of the cutter chain 66 and the conveyor chain 70 can be fixed in such embodiments. In other embodiments, the main motor 86 can be coupled to a transmission or other mechanical device allowing the cutter chain 66 and/or the conveyor chain 70 to be driven at two or more mechanically-defined speeds. In these and other embodiments, electronic devices can be used to change the speed at which the main motor 86 operates, thereby varying the speed at which the cutter chain 66 and the conveyor chain 70 rotate. In some embodiments in which the chain speed can be changed, such speed changes can be made "on the fly".

The cutter arm motor 90 illustrated in FIG. 2 provides the force or torque needed to pivot or rotate the cutter arm 62 around the base or bottom of the silo 22. In some embodiments, the cutter arm motor 90 is a 1.6 hp electric motor. In other embodiments, the cutter arm motor 90 can be sized differently, depending at least in part upon the size and configuration of the cutter arm 62 and pivot assembly 78. The cutter arm motor 90 is coupled to one or more gears, pulleys, sprockets, drums, belts, chains, cables, drive shafts, and/or other power transmission components (not shown in FIG. 2, but included within a gearbox 92 and located beneath the cutter arm 62 of FIG. 2) to transfer power from the cutter arm motor 90 to the cutter arm 62. In some embodiments, the gearbox 62 and/or other power transmission components between the cutter arm motor 90 and the cutter arm 62 can also be used to interrupt the transfer of power from the cutter arm motor 90 to rotation of the cutter arm 62 (i.e., a hold cycle, described below). For example, a clutch (not shown) can be located in or coupled to cutter arm motor 90 for this purpose. In this manner, the cutter arm motor 90 can continue to operate without driving the cutter arm 62.

In some embodiments, the cutter arm motor 90 is designed to operate at only one speed. As such, the speed with which the cutter arm 62 pivots around the base or bottom of the silo 22 can be fixed in such embodiments. In other embodiments, the cutter arm motor 90 can be coupled to a transmission or other mechanical device allowing the cutter arm 62 to pivot around the base or bottom of the silo 22 at two or more mechanically-defined speeds. In these and other embodiments, the speed of the cutter arm motor 90 can be manipulated using one or more electronic devices (or other mechanical devices) allowing the cutter arm 62 to pivot around the base or bottom of the silo 22 at varying speeds. In some embodiments in which the pivot speed of the cutter arm 62 can be manipulated, such speed changes can be made "on the fly" (described in greater detail below).

In some embodiments, a third motor (not shown) can be employed so that each of the sections of the unloader 50 (i.e., the cutter arm 62, the conveyor chain 70, and the cutter chain 66) can be driven by dedicated motors. If utilized, the third motor can be coupled to the cutter chain 66 or the conveyor chain 70, allowing independent operation of the two chain systems with respect to the other motor-driven components. In some embodiments, the third motor can be mounted in any suitable manner within or outside of the silo 22 (e.g., within or adjacent a bottom trough of the silo 22) so that it adjacent and/or coupled directly to the pivot assembly 78. Also, in some embodiments, a third motor and drive system could be mounted in a suitable manner to permit the third motor to be remotely coupled to the pivot assembly 78.

Figure 3:
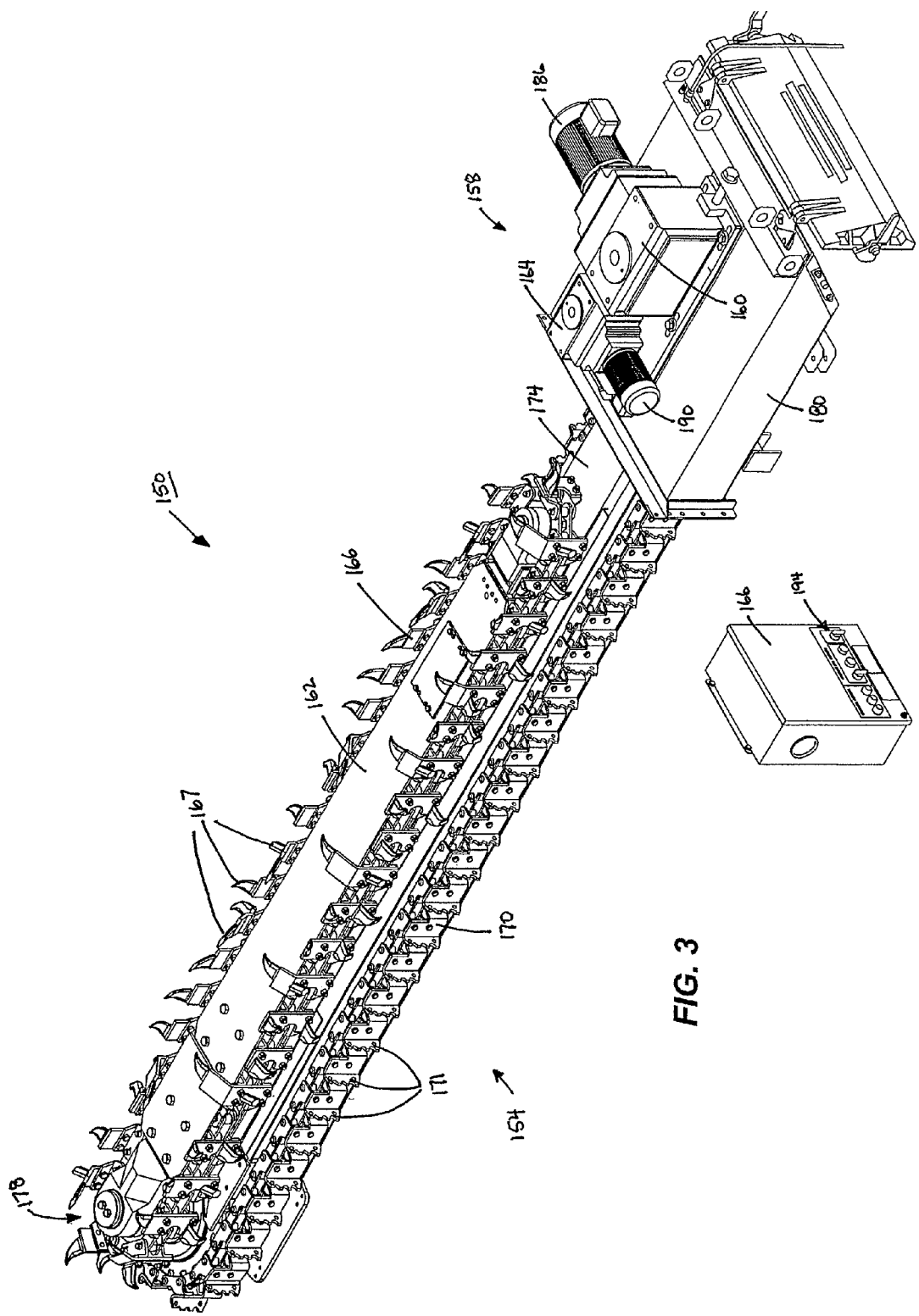
FIG. 3 is a perspective view of an unloader according to another embodiment of the present invention.

FIG. 3 illustrates another embodiment of an unloader 150. This embodiment employs much of the same structure and has many of the same operational features as the embodiments described above with reference to FIG. 2. Accordingly, the following description focuses primarily upon those elements and features that are different from the embodiments described above. Reference should be made to the above description for additional information regarding the elements, features, and possible alternatives to the elements and features of the unloader 150 illustrated in FIG. 3 and described below. Elements and features of the embodiment shown in FIG. 3 that correspond to elements and features of the embodiment of FIG. 2 are designated hereinafter in the 100 series of reference numbers.

The unloader 150 illustrated in FIG. 3 includes a drive section 158 having a main motor 186 and associated main gearbox 160, a cutter arm motor 190 and associated cutter arm gearbox 164, and a control box 166. Similar to the illustrated embodiment of FIG. 2, the main motor 186 and the cutter arm motor 190, provide the mechanical force required to drive or rotate the cutter and conveyor chains 166, 170, and the cutter arm 162, respectively. In some embodiments, the main motor 186 and the cutter arm motor 190 are positioned and connected to drive the cutter and conveyor chains 166, 170 and the cutter arm 162 in manners that are different from that shown in FIG. 3. Like the embodiment of FIG. 2, the main and cutter arm motors 186, 190 can be positioned and mounted in any other manner suitable for mechanical connection to the power transmission components driving the chains 166, 170 and cutter arm 162. Also, the main and cutter arm motors 186, 190 can be mechanically connected to the chains 166, 170 and cutter arm 162 via any combination of power transmission components, such as by respective gearboxes (e.g., see gearboxes 160 and 164 in FIG. 3). It should be noted that such power transmission components can include electronic controls (described below) to control the rotation of the cutter arm 162, to control the speed of the cutter chain 166, and/or to control the speed of the conveyor chain 170. Such electronic controls can be used in conjunction with or in place of mechanical power transmission components to control the speed of the cutter arm 162, the cutter chain 166, and/or the conveyor chain 170.

The control box 166 houses electronic equipment used to control the operations of the unloader 150, as previously described. In some embodiments, the control box 166 is positioned remote from the drive section 158. Generally, however, the control box 166 can be positioned such that a user can monitor the operation of the unloader 150 while the unloader 150 is removing material from the silo 22. Similar to the illustrated embodiment of FIG. 2, the control box 166 can also include a plurality of user input devices 194 which can be used to control the operations of the unloader 150 (described below).

Figure 4A:
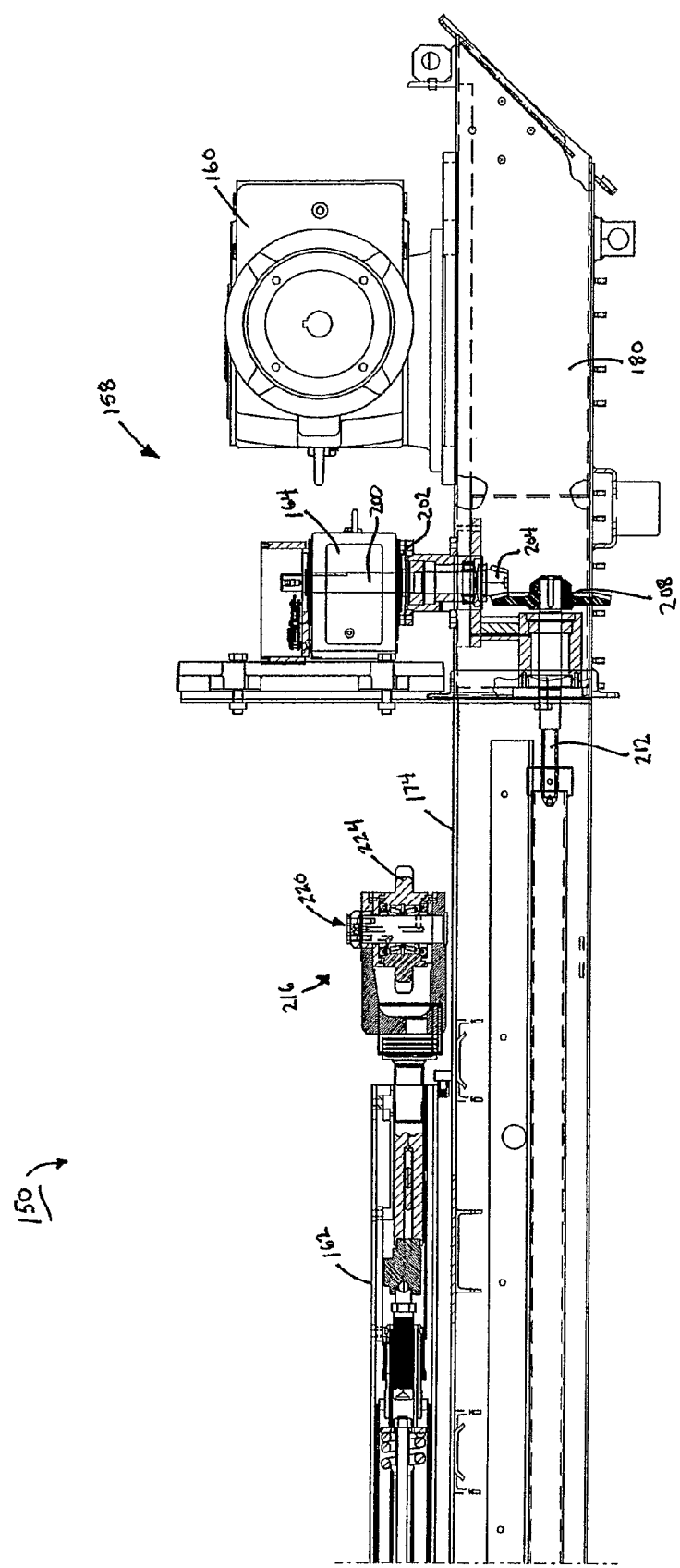
FIG. 4A is a partial cross sectional view of a portion of the unloader shown in FIG. 3, with portions of the unloader removed for clarity.

FIG. 4A illustrates a partial cross section of the drive section 158 (FIG. 3), which, among other things, shows several of the mechanical components used to drive the rotation of the cutter arm 162. The cutter chain 166 and the conveyor chain 170 have been removed from FIG. 3 in order to show other components of the unloader 150 more clearly. It should be understood that the particular mechanical components of the unloader 150 shown in FIG. 4A for driving the cutter arm 162 are provided by way of example only, and that the cutter arm 162 is capable of being driven using other mechanical components falling within the spirit and scope of the present invention.

With continued reference to the illustrated embodiment of FIG. 3, and with particular reference to FIG. 4A, the main motor 186 and the main motor gearbox 160 are positioned above or generally on top of the discharge chute 180, although other positions and configurations of the main motor 186, and main motor gearbox 160 (if employed) are possible. A main motor shaft (not shown) extends from the main motor gearbox 160 and into the discharge chute 180. In some embodiments, an end of the main motor shaft is positioned approximately mid way through the height of the discharge chute 180. A main motor shaft sprocket (also not shown) can be coupled to the end of the main motor shaft. As such, rotation of main motor 158 and associated components within the main motor gearbox 160 cause the main motor shaft and sprocket to rotate. The conveyor chain 170 can be wrapped around the main motor shaft sprocket such that rotation of the main motor shaft and sprocket rotates the conveyor chain 170. As a result, the speed at which the main motor 186 operates can determine the speed at which the conveyor chain 170 rotates. In some embodiments, the conveyor chain 170 can be used to drive the rotation of the cutter chain 166 (described below).

The cutter arm motor 190 in the illustrated embodiment of FIG. 3 is coupled to the gearbox 164, as previously described. As such, the cutter arm motor 190 can drive a primary cutter arm shaft 200, shown in FIG. 4A. In some embodiments, the primary cutter arm shaft 200 also includes a torque sensor (indicated generally at box 202). The torque sensor 202 can be used, for example, to measure the torque of the cutter arm 162 as will be described in greater detail below. A bevel gear 204 is coupled to the primary cutter arm shaft 200 shown in FIG. 4A. The bevel gear 204 rotates with the primary cutter arm shaft 200, and drives a second bevel gear 208 which turns a cutter arm drive shaft 212. The drive shaft 212 rotates the cutter arm 162, as will be described below with regard to FIG. 4B. In some embodiments, the cutter arm motor 190 turns at approximately 1700 revolutions per minute ("RPM"). Additionally, the gear ratio between the bevel gear 204 and the bevel gear 208 can result in a drive shaft rotation speed of approximately 1 RPM. Of course, the cutter arm motor 190 can operate at a different speed, which can affect the rate at which the drive shaft 212 turns, and can therefore ultimately affect the rate at which the cutter arm 162 pivots. Additionally or alternatively, the gear ratio between the bevel gear 204 and the bevel gear 208 can be altered, which can also change the rate at which the drive shaft 212 turns. Furthermore, any other combination of power transmission components can be employed to drivably connect the cutter arm motor 190 to the drive shaft 212.

A distal end 216 of the cutter arm 162 is also shown in FIG. 4A. The distal end 216 of the illustrated cutter arm 162 includes a distal cutter chain shaft 220 and sprocket 224. In some embodiments (e.g., the illustrated embodiment of FIGS. 3-5), the sprocket 224 is not powered, such as by a dedicated motor. As such, the shaft 220 and sprocket 224 can simply provide a mechanism about which the cutter chain 166 is rotated. In other embodiments, the distal end 216 of the cutter arm 162 includes a motor or other prime mover to aid in driving the rotation of the cutter chain 166.

Figure 4B:
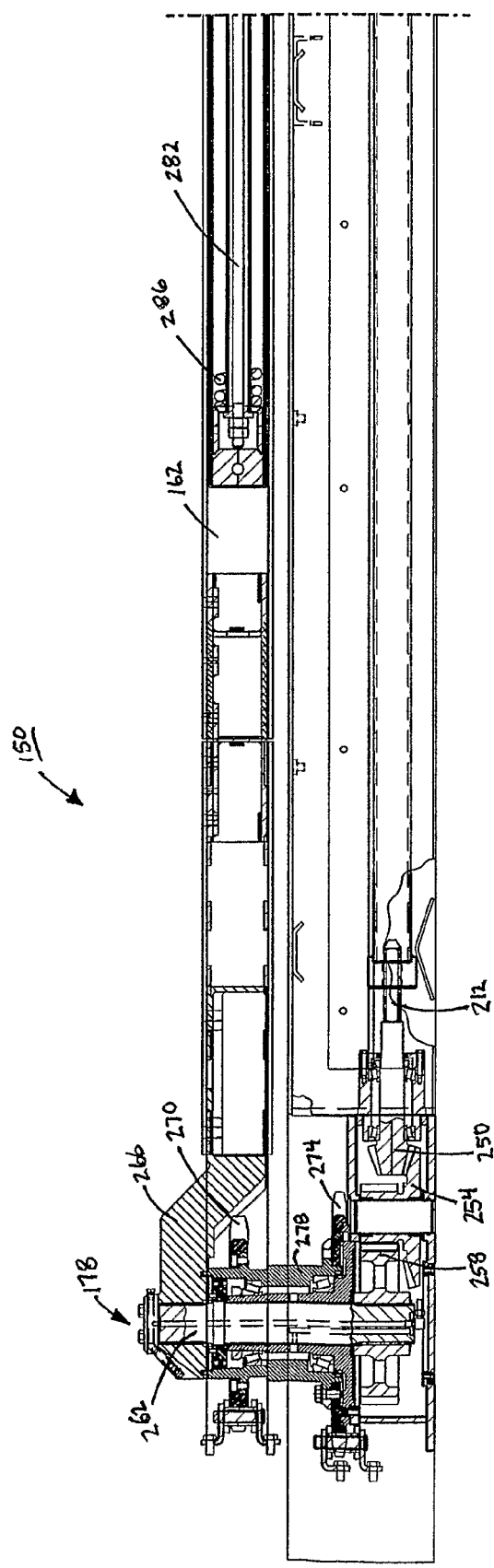
FIG. 4B is a partial cross sectional view of another portion of the unloader shown in FIG. 3, with portions of the unloader removed for clarity.

FIG. 4B illustrates a cross section of the arm assembly 154 and the pivot assembly 178 shown in FIG. 3 (with the cutter chain 166 and conveyor chain 170 removed for clarity). A terminal drive shaft bevel gear 250 is coupled to an end of the drive shaft 212 nearest the pivot assembly 178. As the drive shaft 212 rotates, the terminal drive shaft bevel gear 250 also rotates, thereby driving a dual gear 254 coupled with the terminal drive shaft bevel gear 250. Rotation of dual gear 254 drives a terminal cutter arm shaft gear 258 and a terminal cutter arm shaft 262 coupled thereto. The terminal cutter arm shaft 262 is coupled to a goose-neck 266 of the cutter arm 162, thereby causing the cutter arm 162 to rotate with the cutter arm shaft 262. It will be appreciated that other power transmission elements can be coupled to the drive shaft 212 and to the cutter arm 162 in order to drive the cutter arm 162 in other manners, all of which fall within the spirit and scope of the present invention.

Referring back to the illustrated embodiment shown in FIG. 4B, in some embodiments, the gear ratios between the terminal drive shaft bevel gear 250, the dual gear 254, and the terminal cutter arm shaft gear 258 are such that rotation of the drive shaft 212 at 1 RPM rotates the cutter arm 162 at approximately 0.026 RPM. As a result, if continuously driven, the cutter arm 162 rotates approximately one-and-a-half times around the bottom or base of the silo 22 in one hour. In other embodiments, the gearing or other power transmission components coupling the drive shaft 212 to the cutter arm 162 can be adapted to drive the cutter arm 162 at any other speed desired.

A primary cutter chain sprocket 270 and a terminal conveyor chain sprocket 274 are also shown in FIG. 4B. The conveyor chain 170, driven by the main motor 158 as described above, drives both the primary cutter chain sprocket 270 and the terminal conveyor chain sprocket 274, thereby driving both chains 166, 170. In particular, rotation of the conveyor chain 170 in the illustrated embodiment of FIGS. 3-5 causes the terminal conveyor chain sprocket 274 to rotate, which is coupled to and drives a sprocket sleeve 278 and primary cutter chain sprocket 270 as shown in FIG. 4B. Therefore, in some embodiments, the primary cutter chain sprocket 270 and the terminal conveyor chain sprocket 274 simply provide a mechanism about which the cutter chain 166 and the conveyor chain 170 rotate. In some embodiments, the primary cutter chain sprocket 270 and/or the terminal conveyor chain sprocket 274 can be coupled to a motor or other prime mover in order to drive either or both sprockets 270, 274 (and either or both chains 166, 170) at or adjacent the axis of rotation of the cutter arm 162. Also, in some alternative embodiments, the cutter chain 166 is directly driven by a motor or other prime mover as described above. In such cases, the cutter chain 166 can drive the conveyor chain 170, such as by the sprocket and sleeve mechanism described above or by any other driving relationship between the cutter and conveyor chains 166, 170.

In some embodiments, primary cutter chain sprocket 270 and the terminal conveyor chain sprocket 274 have different sizes. As a result, the cutter chain 266 can rotate at a different rate than that of the conveyor chain 270. For example, in the embodiment shown in FIG. 4B, the terminal conveyor chain sprocket 274 is larger (i.e. has a greater diameter) than the primary cutter chain sprocket 270. This size relationship results in the conveyor chain 270 rotating at a greater rate than the cutter chain 266. Such a speed differential can be beneficial, enabling material to be removed from the silo 22 at a faster rate than it is loosened by the cutter chain 266. In other embodiments, the cutter chain 266 and the conveyor chain 270 can be rotated at the same speed (e.g., such as by primary cutter chain and terminal conveyor chain sprockets 266, 270 having the same size) or at other speed differences.

Still referring to FIG. 4B, some embodiments of the unloader 150 have a tensioning mechanism 282. In some embodiments, the tensioning mechanism 282 can include one or more tensioning springs 286. Part or all of the tensioning mechanism 282 can be located in the cutter arm 162 (e.g., as shown in FIGS. 4A and 4B), if desired. The tensioning mechanism 282 and tensioning springs 286 can bias the distal end of the cutter arm 216 away from the pivot assembly 178. As a result, the tensioning mechanism 282 can maintain tension on the cutter chain 166 as the components of the cutter chain 166 begin to wear. In other embodiments, the tensioning mechanism 282 can be configured differently. Additionally, in some embodiments, the cutter chain 166 and/or conveyor chain 170 can include low-friction bearings in the chain links, such as bearings comprising plastic or other synthetically produced material. In some embodiments, such bearings can be included between a pin and a bushing of each chain link.

Figure 5:
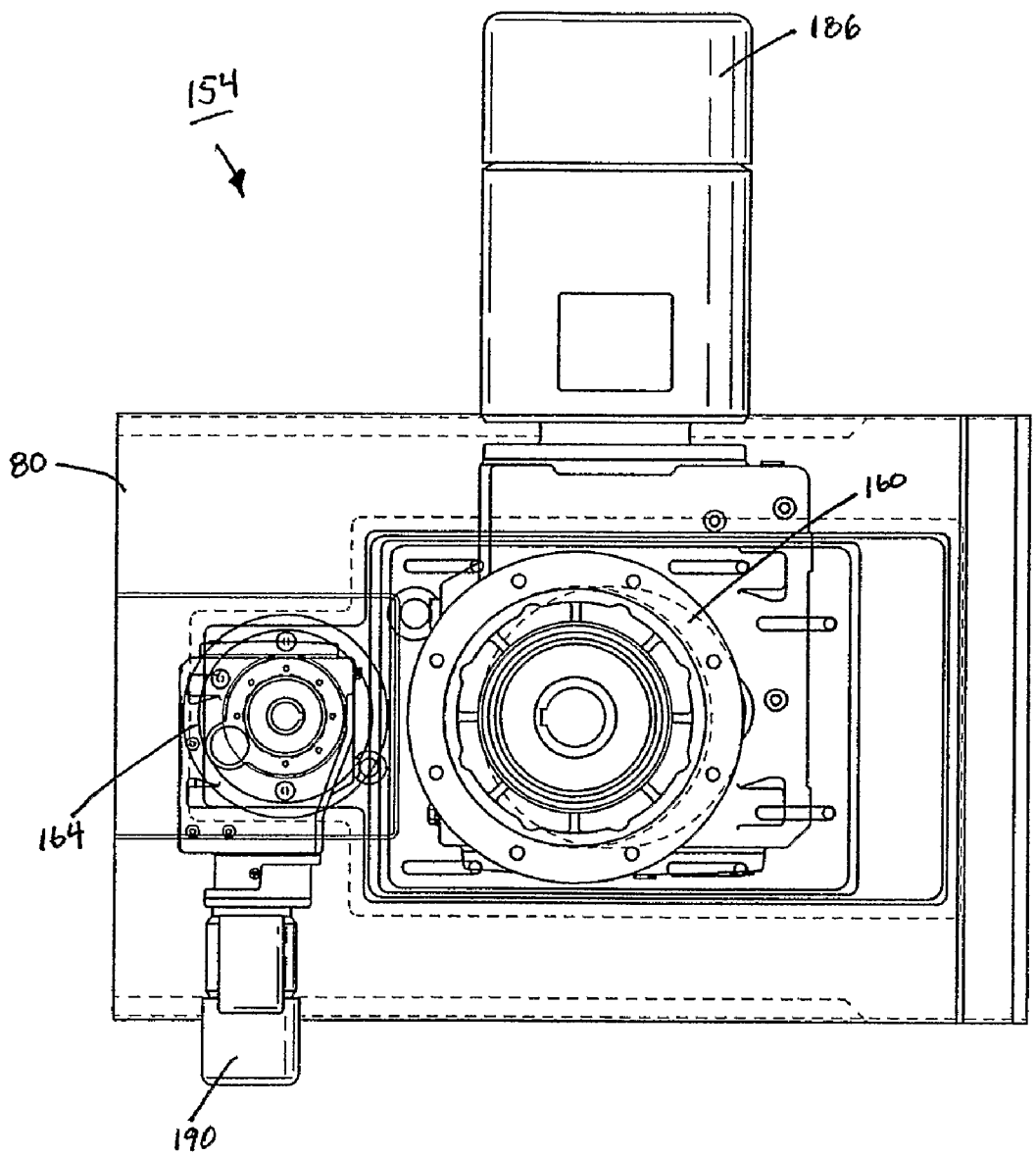
FIG. 5 is a top view of a drive section of the unloader shown in FIG. 3.

FIG. 5 illustrates a top view of the drive section 154 of the unloader 150 illustrated in FIGS. 3-4B, and shows the orientation of the main motor 186, the main motor gearbox 160, the cutter arm motor 190, and the cutter arm gearbox 164 in greater detail. In the embodiment shown, the main motor gearbox 160 and the cutter arm gearbox 164 are positioned directly adjacent one another. Additionally, the main motor 186 is coupled to the main motor gearbox 160, and is oriented in a direction opposite that of the cutter arm motor 190 coupled to the cutter arm gearbox 164. In other embodiments, the main motor 186, the main motor gearbox 160, the cutter arm motor 190, and the cutter arm gearbox 164 can be positioned differently.

Figure 6:
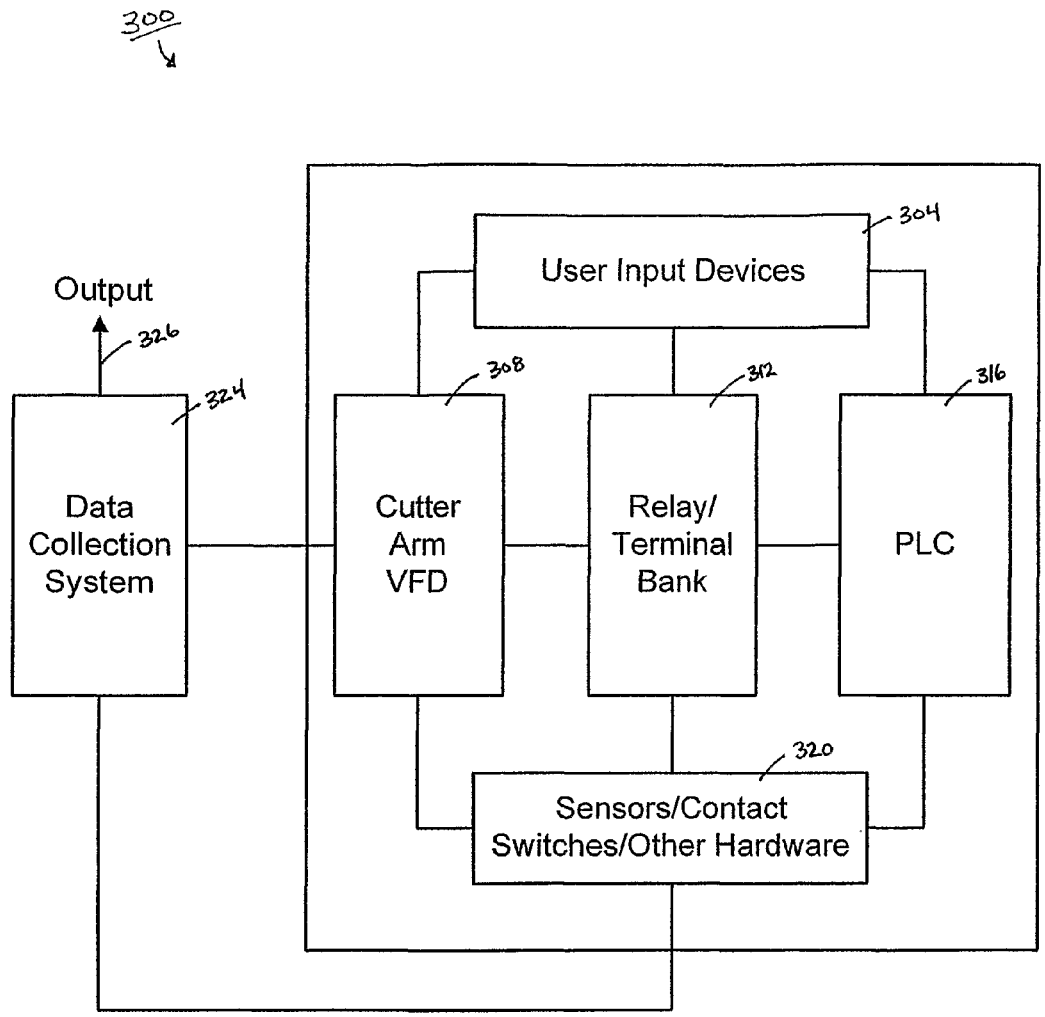
FIG. 6 is a block diagram of a control system according to an embodiment of the present invention.

FIG. 6 illustrates an unloader control system 300 according to an embodiment of the present invention. The control system 300 is described herein for use with the unloader 150 illustrated in FIGS. 3-5. However, it will be appreciated that the unloader 50 illustrated in FIG. 2 and other unloaders can be adapted for control by the control system 300. The control system 300 includes a plurality of user input devices 304 (which can include the user input devices 170 described above), a variable frequency drive (hereinafter, "VFD") 308, a relay/terminal bank 312, a programmable logic controller (hereinafter "PLC") 316, and a plurality of sensors, contact switches, and other electronic hardware 320. In other embodiments, the control system 300 can include additional components (e.g., additional VFDs, PLCs, and the like) not shown in FIG. 6. The control system 300 can be located at least partially within the control box 166 (FIG. 3). For example, the user input devices 304 can be mounted to the outside of the control box 166 and electronically connected to the other components of the control system 300 (e.g., the VFD 308, the terminal bank 312, and/or the PLC 316) that are positioned within the control box 166. The control system 300 can be used to control the functions of the unloader 150. More specifically, the control system 300 can be used to control the operation of the main motor 186 and/or the cutter arm motor 190, which affects the manner in which the cutter chain 166, the conveyor chain 170, and/or the cutter arm 162 operate.

In some embodiments, operation of the main motor 186 is manually controlled using an input device 304. For example, actuating an input device 304 (e.g., a start switch) can cause the main motor 158 to begin to operate at a constant speed. In the illustrated embodiment of FIGS. 3-5, this causes the cutter chain 166 and the conveyor chain 170 to turn at a constant rate. The main motor 186 can also be manually controlled to operate at several different predefined speeds. For example, a user can select the speed of the main motor 186 (e.g., low, medium, and high speeds) using a different input device 304 (e.g., a selector switch or other control). As such, in some embodiments, the speed of the cutter chain 166 and/or the speed of the conveyor chain 170 can be changed from one predefined speed to another by the input device 304. Changing the speed of the cutter chain 166 and the conveyor chain 170 can affect the rate at which material is removed from the silo (herein after referred to as the "delivery rate"). In those embodiments in which the cutter chain 166 and the conveyor chain 170 are driven by separate motors or other prime movers, the control system 300 can include separate controls for each motor or other prime mover, either or both of which can have adjustable or non-adjustable speeds as desired.

In some alternative embodiments, the main motor 186 can be automatically controlled using a main motor VFD (not shown). In such embodiments, data obtained regarding one or more operating parameters (e.g., chain speed, main motor torque, main motor temperature, delivery rate, and the like) can be used to automatically alter the operation of the main motor 186 without a manual user input. For example, one or more sensors 320 (e.g., current sensors, torque sensors, velocity sensors, position sensors, and the like) can monitor a variety of main motor, cutter chain, and conveyor chain parameters. When the sensed or measured parameters stray from or breach predefined parameter thresholds or boundaries, the operation of the main motor 186 can be altered accordingly. For example, in some embodiments, a certain main motor torque threshold is stored in the PLC 316. If a main motor torque sensor measures main motor torque values that are above the main motor torque threshold stored in the PLC 316, the main motor VFD can slow down the main motor 186 in order to relieve excess main motor torque. This speed reduction can help preserve integrity of the main motor 186, and can prolong the life of the main motor 186. In some embodiments, the speed of the main motor 186 can be increased or decreased to alter the delivery rate in response to a sensed delivery rate characteristic (e.g., pounds of material removed per unit time as measured by a scale).

In some embodiments, the cutter arm 162 can have three or more operating modes that are controlled using the control system 300, including an "advance" mode, a "hold" mode, and a "reverse" mode that can be implemented manually or automatically (described below). Implementing the operating modes can improve or optimize the manner in which the cutter arm 162 rotates through material in the silo 22, and/or can reduce stress on the cutter arm motor 190. The advance mode can be used to pivot the cutter arm 162 into material while the cutter chain 166 and/or the conveyor chain 170 is rotated. The hold mode can be used to stop pivoting movement of the cutter arm 162. In some embodiments, the hold mode is entered by disengaging a clutch brake drivably coupled to the cutter arm motor 162, or by engaging or disengaging another device to stop rotation of the cutter arm 162 while allowing the cutter arm motor 190 to continue to turn. Additionally, the cutter chain 166 and the conveyor chain 170 can continue to be driven when the cutter arm 162 is in the hold mode (i.e., is not pivoting about the pivot assembly 178). The reverse mode can be used to reverse the pivoting direction of the cutter arm 162.

In some embodiments, one or more of the modes described above can include one or more different speed settings. The speed settings can depend upon the operation of the cutter arm motor 190. For example, in some embodiments, the advance mode includes several different speed settings which at least partially determine how quickly the cutter arm 162 pivots about the pivot assembly 178. Controlling the speed of the cutter arm motor 190, and therefore the speed with which the cutter arm 162 pivots about the pivot assembly 178, can at least partially controls the delivery rate of material.

With continued reference to the unloader control system 300 illustrated in FIG. 6, in some embodiments, each of the modes (advance, hold, and reverse) and speed settings of the illustrated embodiment can be manually or automatically initiated and/or controlled using the components of the control system 300 (e.g., the input devices 304, a cutter arm VFD 308, the PCL, etc). For example, a user can manually initialize one or more of the modes with the user input devices 304, such as by actuating a pushbutton or selector switch to advance the cutter arm 162 into the material (i.e. pivoting the cutter arm 162 about the pivot assembly 178). As another example, a user can initiate the hold mode and reverse mode manually with similar switches and/or pushbuttons. Additionally, in some embodiments, the speed with which the cutter arm 162 is advanced or reversed can be manually controlled using an input device 304.

In some embodiments, initiating each of the operating modes and speed settings of the cutter arm 162 described above can be completed automatically using the PLC 316, the cutter arm VFD 308, and/or other electronic and mechanical mechanisms. For example, similar to the control system of the main motor 186 described above, a plurality of operating parameters (e.g., cutter arm motor torque, cutter arm motor temperature, material delivery rate, and the like) can be used to automatically alter operation of the cutter arm motor 190 without a manual user input. One or more sensors 320 (e.g., current sensors, torque sensors, velocity sensors, position sensors, and the like) can monitor characteristics of the cutter arm 162, the cutter arm motor 190, or drive train components therebetween (e.g., current draw, torque, bending stress, and the like). When the sensed or measured parameters stray from or reach predefined parameter thresholds or boundaries, operation of the cutter arm motor 190 can be altered accordingly, an example of which is provided in FIGS. 7A-7B.

Referring still to FIG. 6, a data collection system 324 can be used to gather information and data from the cutter arm VFD 308 and the sensors 320. In some embodiments, the data collection system 324 includes a memory to store the data that is collected. The data collection system 324 can then transmit that data to another computer, electronic apparatus (e.g., controls operating the main 186 and/or cutter arm motors 190) through an output port 326. The data retrieved from the data collection system 324 can be used to optimize the operations carried out by the control system 300. In some embodiments, the data collection system 324 can be integrated into the control system 300.

Figure 7A:
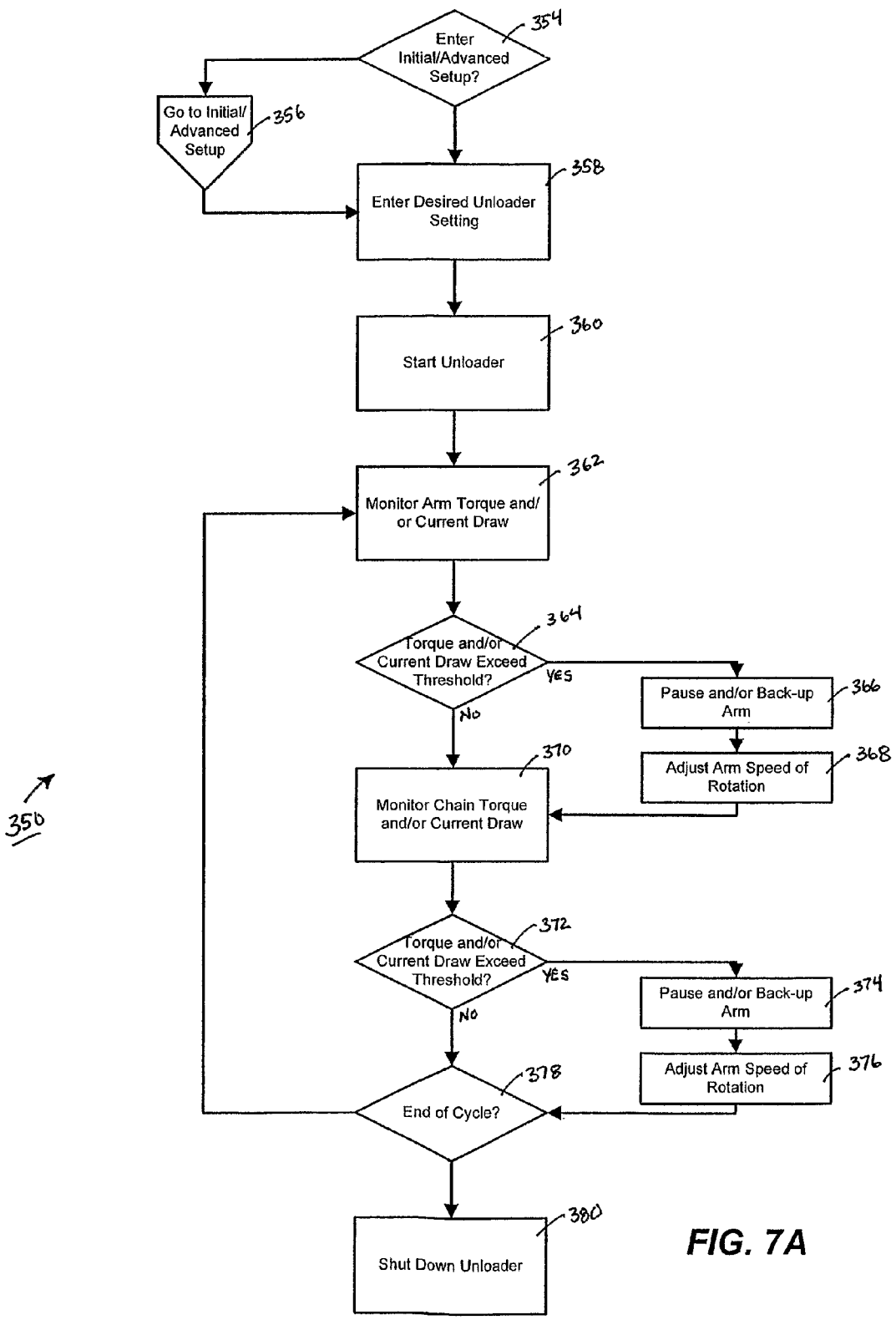
FIG. 7A is a flow chart of a main process of an unloader according to an embodiment of the present invention.

FIG. 7A illustrates an example of a main process 350 that can be used to automatically control operation of the cutter arm 162 (i.e., to control the mode and speed setting of the cutter arm 62). In some embodiments, the main process 350 is a control program stored in the PLC 316 of the control system 300 (FIG. 6). As such, it should be understood that operation of the cutter arm 162 is capable of being controlled by other parameters and using other processes than those shown and described in FIG. 7A-7B. Additionally, some of the process steps described with respect to FIGS. 7A-7B allow and/or require a user to enter parameters and data into the control system 300 to be stored and used in the PLC 316. Data can be entered, for example, using one or more of the user input devices 304 (FIG. 6). The data can be entered by the engineer or other unloader professional, or by the user. It should be noted that other embodiments of the main process 350 can include fewer or less user inputs, and that the number, type, and order of user inputs illustrated and disclosed herein is only presented by way of example.

The main process 350 begins by deciding whether to enter the initial/advanced setup (block 354). The initial/advanced setup can be entered, for example, immediately following installation of the unloader 150. As described with respect to FIG. 7B, the initial/advanced setup allows a user to input (e.g., to the PLC 316) a plurality of silo and/or material parameters. Inputting the container and material parameters help to improve or optimize removal of material from the silo 22 with the unloader 150. However, the user is not required to enter the initial/advanced setup, as described in greater detail below.

Figure 7B:
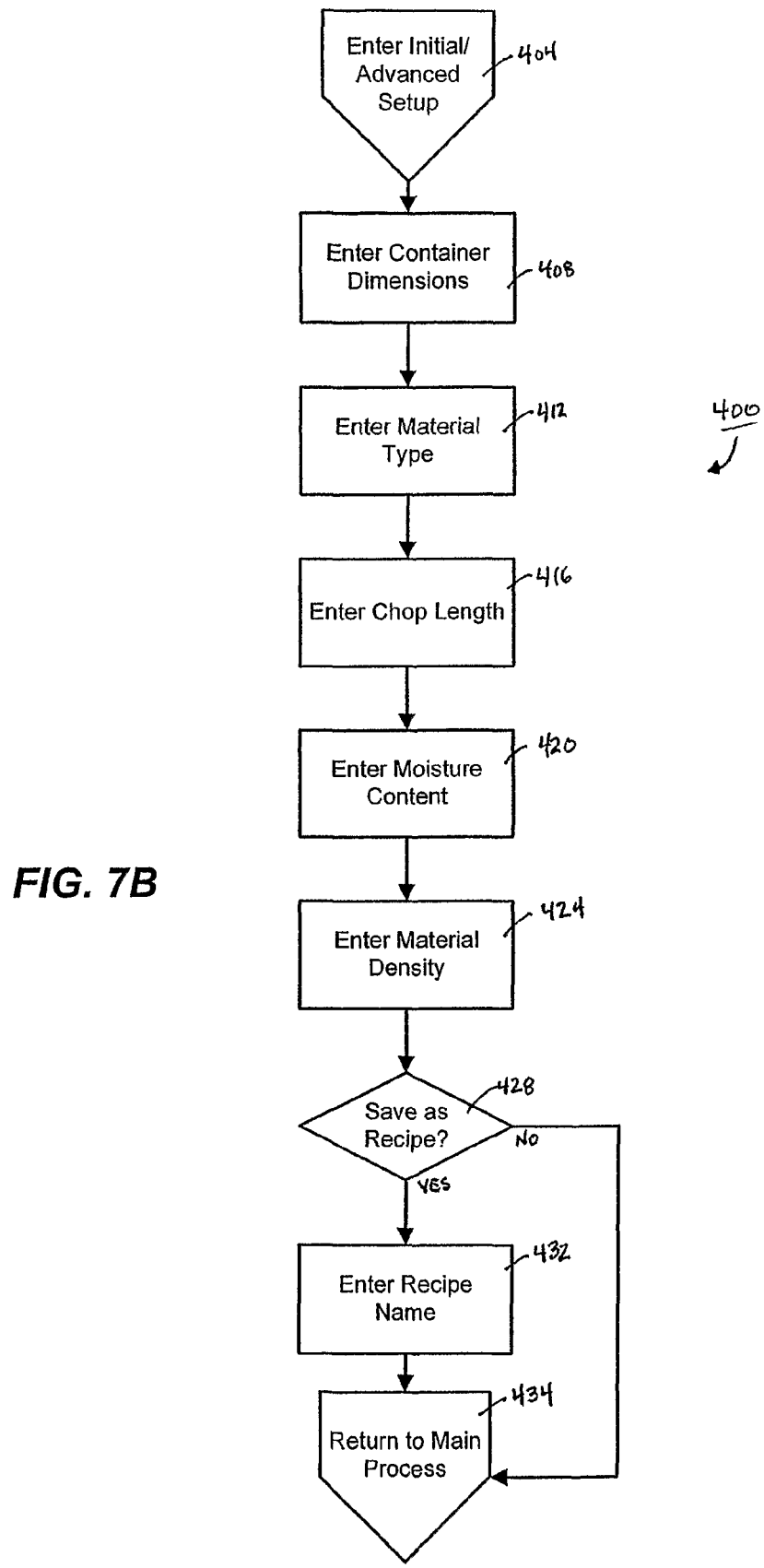
FIG. 7B is a flow chart of a second process of an unloader according to an embodiment of the present invention.

If the initial/advanced setup is entered (block 356) the user can enter a initial/advanced process 400 (step 404), and example of which is illustrated in FIG. 7B. In some embodiments, the user does not need to complete all of the process steps included in the process 400 to return to the main process 350. For example, the user can, in some embodiments, only enter data for one or more of the steps of the process 400. The user can enter the silo or structure dimensions in step 408. For example, the user can enter the diameter, height, volume, or other silo characteristic. A material type (e.g., corn, alfalfa, hay, and the like) can be entered in step 412. The length or chop length (i.e., approximate dimensions of the material) can be entered in step 416. The moisture content (i.e., how much moisture is in the material) can be entered in step 420. The material density can be entered in step 424. Additionally, in other embodiments, additional or alternative material and/or container parameters than those shown can be entered in other steps.

After the desired container and material parameters have been entered (steps 408-424), the user can choose whether to save the parameters as a "recipe" (step 428). The recipe can be saved to the PLC 316 (FIG. 6) or other memory so that the parameters can be used again in the future. An unloader 150 may be used with more than one silo 22 and with more than one type of material. As such, it may be desirable to have several recipes stored, which include the parameters of each silo 22 and material, so that the same material and container parameters do not need to be entered more than once. If the user chooses to save the recipe, a recipe name can be entered (step 432). After saving the recipe name (step 432) the user can be returned to the main process 350 (step 434). If the user does not save the recipe, the user can be returned directly to the main process 350.

Referring again to FIG. 7A, after completing the initial/advanced process 400, the user can return to the main process 350 to enter the desired unloader mode and/or speed settings (step 358). The user can also skip the initial/advanced setup process 400, and proceed directly with entering the desired mode and/or speed settings (step 358). In some embodiments, the user completes step 358 by entering the desired delivery rate (e.g., lbs/sec, lbs/min, etc.). The PLC 316 can then use the desired delivery rate to determine a target or desired mode and speed of the cutter arm motor 190 and/or main motor 186. For example, if a user selects a relatively high delivery rate, the cutter arm motor 190 can be targeted to operate at a relatively fast rate (i.e., relatively high RPM), and/or the advance mode may be active for a relatively long duration (i.e., pivoting into the material for a relatively long time). Alternatively, if a user selects a relatively low delivery rate, the cutter arm motor 190 can be targeted to operate at a slower rate, and/or the advance mode may be active for a relatively shorter duration.

However, in some embodiments, delivery rate and the mode and speed of the cutter arm motor 190 is limited by the characteristics of the material and/or silo 22. For example, for some relatively hard-packed materials, the cutter arm motor 190 may not be able to operate at the target mode or speed, or may not be able to operate at the target mode or speed for a prolonged period of time. Forcing the cutter arm motor 190 to operate at the target mode or speed can cause damage to the cutter arm motor 190 or other unloader components. Such problems can be prevented, however, by determining cutter arm motor limits (e.g., torque limits, current limits, temperature limits, and the like), and storing such limits in the PLC 316, which can also be completed in step 358. The limits can then be monitored using a plurality of sensors 320 (e.g., current sensors, torque sensors, velocity sensors, position sensors, and the like), as previously described. If the cutter arm motor 190 begins to operate outside of the set limits, the cutter arm mode and/or speed can be automatically altered accordingly (described below). In some embodiments, the parameters entered in the initial/advanced setup can affect the limits that are stored in the PLC 316. For example, if a relatively hard-packing material is entered in step 412, the torque and/or current limit of the cutter arm motor 190 can be adjusted accordingly.

In some embodiments, the load on the cutter arm motor 190 can be monitored in different manners. By way of example only, an encoder device (not shown) can be used to track the specific pivot position of the cutter arm 162. Such an encoder device could then send a position reference signal to the PLC 316, which tracks movement of the cutter arm 162. In some embodiments, the PLC 316 can use a timer to verify that the cutter arm 162 has changed speeds, and can accordingly modify speed target signals. As another example, one or more torque sensors can be coupled to the cutter arm drive shaft 212, to the shaft of the cutter arm motor 190, or in other locations along the drive train driving the cutter arm 162. Still other manners of detecting the amount of load upon the cutter arm 162 are possible, and fall within the spirit and scope of the present invention.

The load on the main motor 186 can also affect the delivery rate, and can be limited by the characteristics of the material and/or silo 22. As such, in some embodiments, limits are also set for the main motor 186 (e.g., torque limits, current limits, temperature limits, and the like). Such limits can be stored, for example, in the PLC 316, which can also be completed in step 358. As previously described, then, the main motor limits can be monitored using a plurality of sensors 320 (e.g., current sensors, torque sensors, velocity sensors, position sensors, and the like). If the main motor 186 begins to operate outside of the set limits, the main motor speed can be automatically altered accordingly.

Also in step 358, in some embodiments, the user can enter a desired delivery amount and/or a desired delivery time in step 358. In such embodiments, the unloader 150 can tailor the speed and mode of the unloader arm motor 190 to deliver a certain predetermined amount of material in a certain predetermined amount of time.

After the desired unloader settings have been entered (step 358), a user can start the unloader 150 (step 360). In some embodiments, starting the unloader 150 is completed by manually actuating a user input device 304 (FIG. 6). Starting the unloader 150 can cause the main motor 186 to begin turning the cutter chain 166 and the conveyor chain 170. The cutter arm motor 190 can also begin to pivot or rotate the cutter arm 162 within the silo 22. In some embodiments, the cutter arm 162 does not automatically begin to pivot or rotate within the container when the unloader 150 is started.

As the unloader 150 continues to operate, certain force (e.g., torque) and/or current parameters of the cutter arm motor 190, cutter arm shaft 200, or other drive train components coupled to the cutter arm motor 190 are monitored (step 362), for example, using the cutter arm torque sensor 202 or the cutter motor current sensor (included in the sensors 320) as described above. With reference to the illustrated embodiment of FIGS. 3-6 for example, if the torque of the cutter arm shaft 200 and/or the cutter arm motor current draw exceed a certain predefined limit or threshold (e.g., limits stored in the PLC 316) (step 364), the cutter arm 162 can transition from an advance mode to a hold mode (i.e., stop rotating) (step 366). In some embodiments, the cutter arm VFD 308 can also or instead slow down the rate at which the cutter arm 162 pivots in the advance mode by controlling the cutter arm motor 190 (step 368).

If the parameters measured in step 364 do not exceed the limits stored in the PLC 316, or after the steps 366 and 368 have been completed, the unloader 150 can continue to operate. While operating, certain force and/or current parameters of the main motor 186, the cutter chain 166, and/or the conveyor chain 170 can be monitored (step 370). For example, torque can be measured using an additional torque sensor (not shown) coupled to the shaft of the main motor 186, force can be measured using a strain gauge coupled to either chain 166, 170 or to any of the drive train components between the main motor 186 and either chain 166, 170. As another example, current draw can be measured using a main motor current sensor (included in the sensors 320). If the parameters measured in step 372 exceed certain predefined limits (e.g., limits stored in the PLC 316), the cutter arm 162 can transition from an advance mode to a hold mode, allowing the conveyor chain 170 to remove material that is causing the elevated force and/or current readings. Additionally, in some embodiments, the cutter arm VFD 308 can also slow the rotation of the cutter arm 162 (step 376), as previously described.

The process can be completed by checking whether the cycle has been completed (step 378). For example, as described above, in some embodiments the user can enter a desired delivery amount or delivery time. At step 378, a check is made to determine whether the delivery amount and/or the delivery time have been satisfied. If so, the unloader 150 can be shut down (step 380) or placed in an idle mode. If the delivery amount and/or the delivery time have not been satisfied, the process can return to step 362, and the parameters (force and current draw) can be continually monitored to ensure they do not exceed their predefined limits. In some embodiments, steps 362 through step 378 are completed at the cycle rate of the PLC (e.g., multiple times a second). In other embodiments, the torque and/or current parameters of the motors 186, 190 can be monitored with a different frequency.

The process 350 shown in FIG. 7A describes altering the operation of the cutter arm 162 and/or the cutter arm motor 190 in response to received sensor signals that indicate a force on the cutter arm 62. However, in other embodiments, received sensor signals (e.g., signals received from torque sensors, current sensors, force sensors, etc., that are monitoring parameters of the cutter arm 162, the cutter chain 166, the conveyor chain 170, the cutter arm motor 190, the main motor 186, or a combination thereof) can also be used to alter the operation of the main motor 186. As such, sensor signals can be used to alter the operations of both the cutter arm motor 190 and the main motor 186 in response to forces on the cutter arm 62, the cutter chain 66, and the conveyor chain 70.

Additionally, the process 350 shown in FIG. 7A can be used to monitor the force (e.g., torque) and/or current draw of both the main motor 186 and the cutter arm motor 190. However, in other embodiments, only a subset of the parameters and/or motors is monitored. For example, in an alternative embodiment, only the torque of the cutter arm shaft 200 is monitored with the torque sensor 202 to ensure that the cutter arm motor 190 is not being overloaded or operating outside of predefined limits, as shown in FIG. 8.

Figure 8:
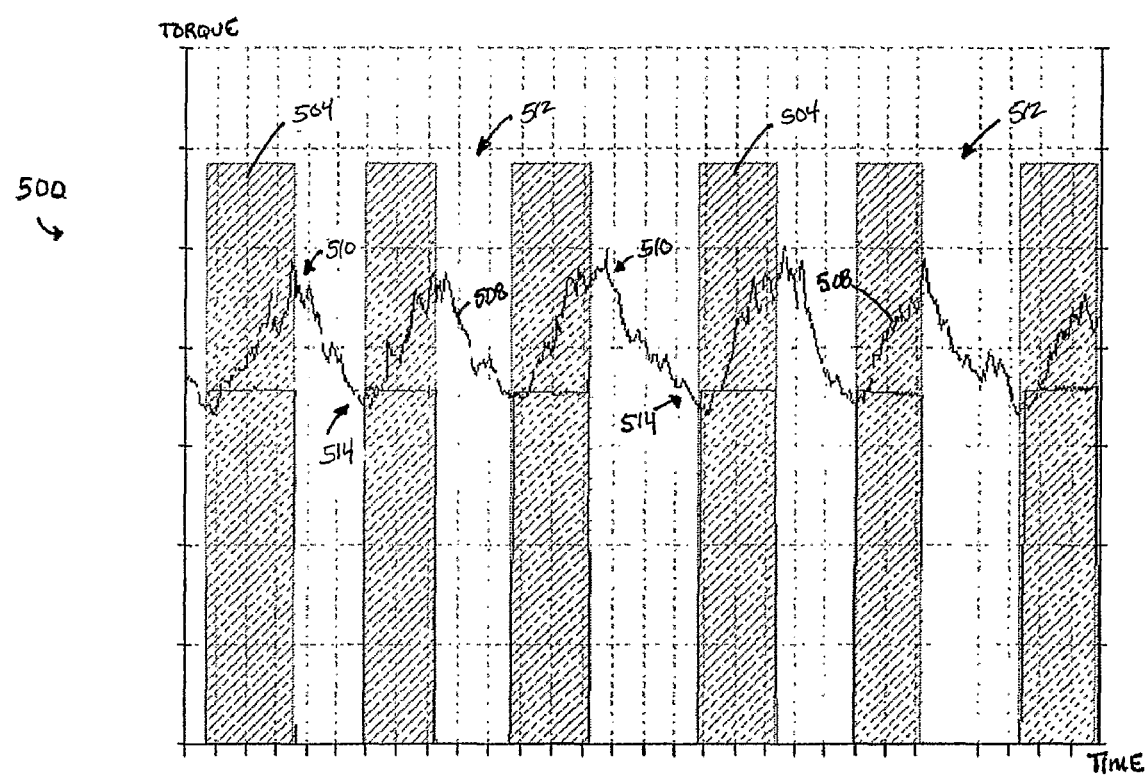
FIG. 8 is a plot of a drive characteristic of an unloader according to an embodiment of the present invention.

FIG. 8 illustrates a plot 500 of cutter arm shaft torque over an amount of time. In the embodiment shown, while the cutter arm 162 is in the advance mode (represented by blocks 504), the cutter arm shaft torque 508 begins to rise. After the cutter arm shaft torque reaches a certain limit (represented by peaks 510), the cutter arm 162 transitions to a hold mode (represented by gaps 512) until the cutter arm shaft torque reaches a lower threshold (represented by troughs 514). The cutter arm 162 then transitions back to the advance mode, and the cutter arm shaft torque 508 begins to rise again.

The embodiments described above and illustrated in the figures are presented by way of example only and are not intended as a limitation upon the concepts and principles of the present invention. As such, it will be appreciated by one having ordinary skill in the art that various changes in the elements and their configuration and arrangement are possible without departing from the spirit and scope of the present invention as set forth in the appended claims.

What is claimed is:

1. An unloader for unloading material from a container, the unloader comprising:
    an unloader arm movable within the container;
    a first chain coupled to the unloader arm and movable to unload material from the container;

a second chain coupled to the unloader arm and positioned to engage material within the container upon movement of the unloader arm;

a sensor located directly on at least one of the unloader arm, the first chain, and the second chain, and configured to directly sense a force on at least one of the unloader arm, the first chain, and the second chain, and to transmit a signal indicative of the force applied to at least one of the unloader arm, the first chain, and the second chain; and a controller configured to receive the signal from the sensor and to alter an operation of at least one of the unloader arm, the first chain, and the second chain, the alteration based at least partially on the signal received from the sensor.

2. The unloader of claim 1, wherein the sensor is configured to transmit a signal indicative of a speed with which the unloader arm moves.

3. The unloader of claim 1, wherein the sensor is configured to transmit a signal indicative of a torque exerted by a motor coupled to the unloader arm.

4. The unloader of claim 1, wherein the sensor is configured to transmit a signal indicative of a current draw of a motor drivably coupled to the unloader arm.

5. The unloader of claim 1, wherein the controller alters at least one of the speed with which the unloader arm moves, the speed with which the first chain moves, and the speed with which the second chain moves.

6. The unloader of claim 5, wherein the controller alters the speed with which the unloader arm moves by transmitting a signal operable to engage a clutch assembly coupled to a cutter arm motor.

7. The unloader of claim 5, wherein the controller alters at least one of the speed with which the first chain moves and the speed with which the second chain moves by transmitting a signal operable to change the speed of a motor.

8. The unloader of claim 1, wherein the unloader arm pivots in the container.

9. A method of controlling a rate of material removal from a container, the method comprising:
inputting a desired unloading characteristic into a controller of an unloader, wherein the unloader includes an unloader arm;
starting the unloader;
moving a chain coupled to the unloader arm;
pivoting the unloader arm in an interior space of the container;
engaging material in the interior space of the container with the unloader arm;
detecting a threshold force upon at least one of the chain and the unloader arm by a sensor located directly on at least one of the unloader arm and the chain; and
altering motion of the unloader arm in response to detecting the threshold force.

10. The method of claim 9, wherein inputting a desired unloading characteristic comprises inputting a desired material delivery rate.

11. The method of claim 9, wherein detecting a threshold force comprises detecting a threshold current draw of a motor drivably coupled to the unloader arm.

12. The method of claim 9, wherein detecting a threshold force comprises detecting a torque exerted by a motor coupled to the unloader arm.

13. The method of claim 9, wherein altering the motion of the unloader arm comprises stopping pivotal movement of the unloader arm.

14. The method of claim 9, further comprising altering motion of the chain coupled to the unloader arm in response to the recognition of the unloader arm loading characteristic.

15. An unloader for unloading material from a container, the unloader comprising:
an unloader arm movable within a container to engage and move material from the container;
a motor coupled to the unloader arm and operable to advance the unloader arm in material within the container;
a sensor located directly on the unloader arm configured to directly sense a loading characteristic of the unloader arm, and to transmit a first signal indicative of the loading characteristic of the unloader arm; and
a controller in communication with the sensor, the controller configured to respond to the first signal from the sensor by reducing advancement of the unloader arm within the container.

16. The unloader arm of claim 15, wherein the controller is responsive to the first signal from the sensor by stopping advancement of the unloader arm within the container.

17. The unloader of claim 15, wherein the sensor is configured to transmit a signal indicative of a torque exerted by the motor drivably coupled to the unloader arm.

18. The unloader of claim 15, wherein the sensor is configured to transmit a signal indicative of a current draw of the motor.

19. The unloader arm of claim 15, wherein the controller reduces the advancement of the unloader arm by transmitting a signal to a variable frequency drive electrically coupled to the motor.

20. A method of controlling a rate of material removal from a container, the method comprising:
inputting at least one of a material characteristic and a container characteristic into a controller of an unloader, wherein the unloader includes an unloader arm positioned to remove material from the container;
determining a threshold value based at least partially on at least one of the material characteristic and the container characteristic, wherein the threshold value corresponds to an amount of force transmitted to at least one of the unloader arm and a chain coupled to the unloader arm;
starting the unloader;
moving the chain coupled to the unloader arm;
pivoting the unloader arm in an interior space of the container;
engaging material in the interior space of the container with the unloader arm;
detecting a threshold force upon at least one of the chain and the unloader arm by a sensor located directly on at least one of the unloader arm and the chain;
comparing the threshold force to the threshold value; and
altering motion of the unloader arm in response to comparing the threshold force to the threshold value.

21. The method of claim 20, wherein determining the threshold value comprises determining a threshold value of at least one of a current draw of a motor and a torque exerted by a motor drivably coupled to the unloader arm.

* * * * *